United States Patent

Rudolph et al.

[11] Patent Number: 5,831,415
[45] Date of Patent: Nov. 3, 1998

[54] ELECTRICAL DISCONNECTION AND AUTOMATIC RE-ENGAGEMENT OF BATTERY MONITORING CIRCUITS

[75] Inventors: Daniel C. Rudolph, Corvallis; Timothy F. Myers, Philomath, both of Oreg.

[73] Assignee: Hewlett-Packard Company, Palo Alto, Calif.

[21] Appl. No.: 958,952

[22] Filed: Oct. 28, 1997

[51] Int. Cl.$^6$ .................................................. H01M 10/46
[52] U.S. Cl. ........................................... 320/112; 320/132
[58] Field of Search ..................................... 320/106, 110, 320/112, 113, 125, 128, 132, 134, 136, DIG. 18, DIG. 19, DIG. 21, 147

[56] References Cited

U.S. PATENT DOCUMENTS

| | | | |
|---|---|---|---|
| 4,150,302 | 4/1979 | Roche | 307/66 |
| 5,153,496 | 10/1992 | LaForge | 320/119 |
| 5,334,925 | 8/1994 | Kendrick | 320/131 |

OTHER PUBLICATIONS

*IBM ThinkPad 750/750C/750s Getting Started*, available from IBM Corporation, p.4. no date.

*Primary Examiner*—Edward Tso

[57] ABSTRACT

A battery pack includes battery storage. The battery storage has a positive terminal and a negative terminal. A power connector is connected to the positive terminal of the battery storage. A ground connector is to the negative terminal of the battery storage. The battery pack also includes an additional connector. Battery monitoring circuitry is used to monitor the battery storage. The battery monitoring circuitry has a power input. Disconnect circuitry is connected to the positive terminal of the battery storage, to the ground connector, to the additional connector and to the power input of the battery monitoring circuit. The disconnect circuitry, in response to a first voltage pattern on the additional connector, electrically connects the power input of the battery monitoring circuitry to the positive terminal of the battery storage. In response to a second voltage pattern on the additional connector, the disconnect circuitry electrically disconnects the power input of the battery monitoring circuitry from the positive terminal of the battery storage.

27 Claims, 8 Drawing Sheets

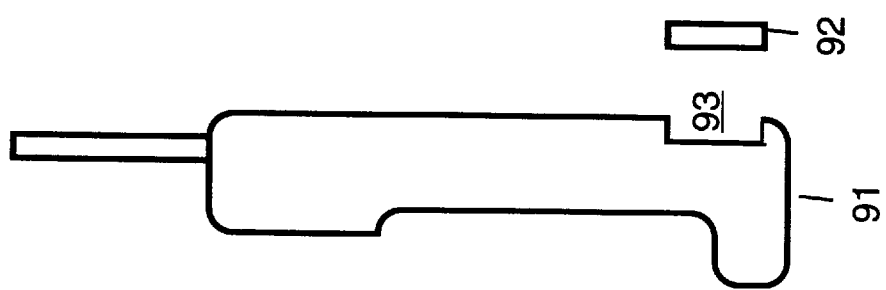

ELECTRICAL DISCONNECTION AND AUTOMATIC RE-ENGAGEMENT OF BATTERY MONITORING CIRCUITS

BACKGROUND

The present invention concerns conserving battery power in battery packs and pertains particularly to electrical disconnection and automatic re-engagement of battery monitoring circuits.

When batteries are stored for long periods of time, e.g., more than three months, the battery cells self discharge. This discharge can be caused by monitoring circuitry. For example, the monitoring circuitry which includes a battery gauge which tracks the amount of charge in the battery will typically slowly drain battery cells being monitored. The discharge which occurs during storage can cause permanent damage to the battery cells.

Various attempts have been made to solve the problem of battery cell discharge during storage. For example, the batteries, when stored, can be inventoried with date codes When the date code is expired, the battery pack can be recharged to a full charge state. However, this process can be inconvenient possibly requiring complicated inventory and date management.

Another technique is to include in the battery pack an internal sensing circuit which detects that the internal battery voltage is low and disconnects the monitoring circuitry. See, for example, the OB5500 Lithium battery pack available from Sony Corporation. This solution has the disadvantage that the drain from the sensing circuit increases the rate at which the battery pack is discharged during storage.

It is also possible to use a mechanical switch to disconnect the battery during storage. However, this generally requires user intervention to turn the battery pack back on. Such a use of a mechanical switch can confuse some users.

SUMMARY OF THE INVENTION

In accordance with the preferred embodiment of the present invention, a battery pack includes battery storage. The battery storage has a positive terminal and a negative terminal. For example, the battery storage is composed of battery cells.

A power connector is connected to the positive terminal of the battery storage. A ground connector is connected to the negative terminal of the battery storage. The battery pack also includes an additional connector which is, for example, a thermistor connector. Battery monitoring circuitry is used to monitor the battery storage. The battery monitoring circuitry has a power input. For example, the battery monitoring circuitry includes battery gauge circuitry which monitors charge in the battery storage.

Disconnect circuitry is connected to the positive terminal of the battery storage, to the ground connector, to the additional connector and to the power input of the battery monitoring circuit. The disconnect circuitry, in response to a first voltage pattern on the additional connector, electrically connects the power input of the battery monitoring circuitry to the positive terminal of the battery storage. In response to a second voltage pattern on the additional connector, the disconnect circuitry electrically disconnects the power input of the battery monitoring circuitry from the positive terminal of the battery storage.

For example, the first voltage pattern includes normal operating voltage for the thermistor connector and the second voltage pattern includes an atypical voltage which is not placed on the thermistor connector during normal operating conditions. For example, the atypical voltage is a voltage that is higher than the normal operating voltage.

For example, the disconnect circuitry includes a switch and control circuitry. In a first state, the switch connects the power input of the battery monitoring circuitry to the positive terminal of the battery storage. In a second state, the switch electrically connects the power input of the battery monitoring circuitry to the negative terminal of the battery storage. The control circuitry, in response to the first voltage pattern, causes the switch to be in the first state. In response to the second voltage pattern, the control circuitry causes the switch to be in the second state. For example, the control circuitry includes a zener diode.

The present invention solves the problem of battery cell discharge during storage. The circuitry used to implement the present invention solution does not increase the rate at which the battery pack is discharged during storage. Additionally, the present invention does not require user intervention to turn the battery pack back on. In the course of normal use, the battery pack is turned back on.

BRIEF DESCRIPTION OF THE DRAWINGS

FIG. 8 shows a portable phone receiving a battery pack.

DESCRIPTION OF THE PRIOR ART

Figure 1:
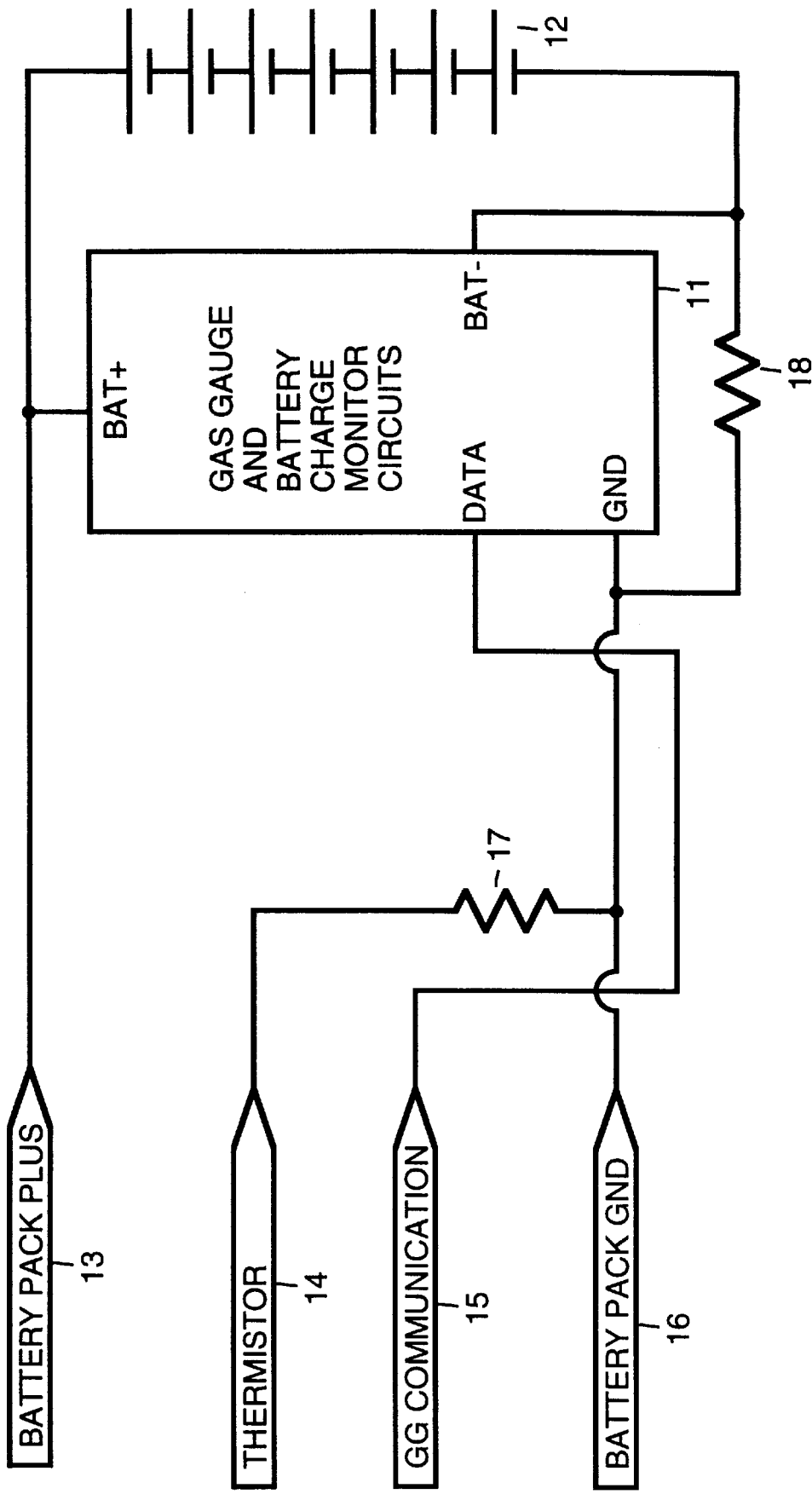
FIG. 1 is a simplified block diagram of a battery pack in accordance with the prior art.

FIG. 1 is a simplified diagram of a battery pack in accordance with the prior art. The battery pack includes battery cells 12. Gas gauge and battery charge monitor circuits 11 is monitoring circuitry which monitors the charging of battery cells 12 and indicates the amount of charge stored in battery cells 12. Gas gauge and battery charge monitor circuits 11 utilizes a current sense resistor 18 to perform monitoring of the charging of battery cells 12 and to detect the amount of charge stored in battery cells 12.

A battery pack voltage (BAT+) input of gas gauge and battery charge monitor circuits 11 detects the voltage on a battery pack positive voltage connector (battery pack plus) 13. A ground input (GND) of gas gauge and battery charge monitor circuits 11 is connected to a battery pack ground (GND) connector 16. Ground input (GND) of gas gauge and battery charge monitor circuits 11 is also connected to a thermistor connector 14 through a thermistor resistor 17. Gas gauge (GG) communication connector 25 is connected to a data input of gas gauge and battery charge monitor circuits 11.

When the battery pack shown in FIG. 1 is stored for long periods of time, e.g., more than three months, the battery pack become discharged. This discharge is caused by the self discharge of battery cells 12 and by gas gauge and battery charge monitor circuit 11. The self-discharge of battery cells 12 will be halted when the voltage across battery cells 12 is reduced to a level which is determined by the chemical makeup of battery cells 12. The additional discharge caused by gas gauge and battery charge monitor circuits 11 power drain causes the voltage across battery cells 12 to be reduced further causing permanent damage to battery cells 12.

DESCRIPTION OF THE PREFERRED EMBODIMENT

Figure 2:
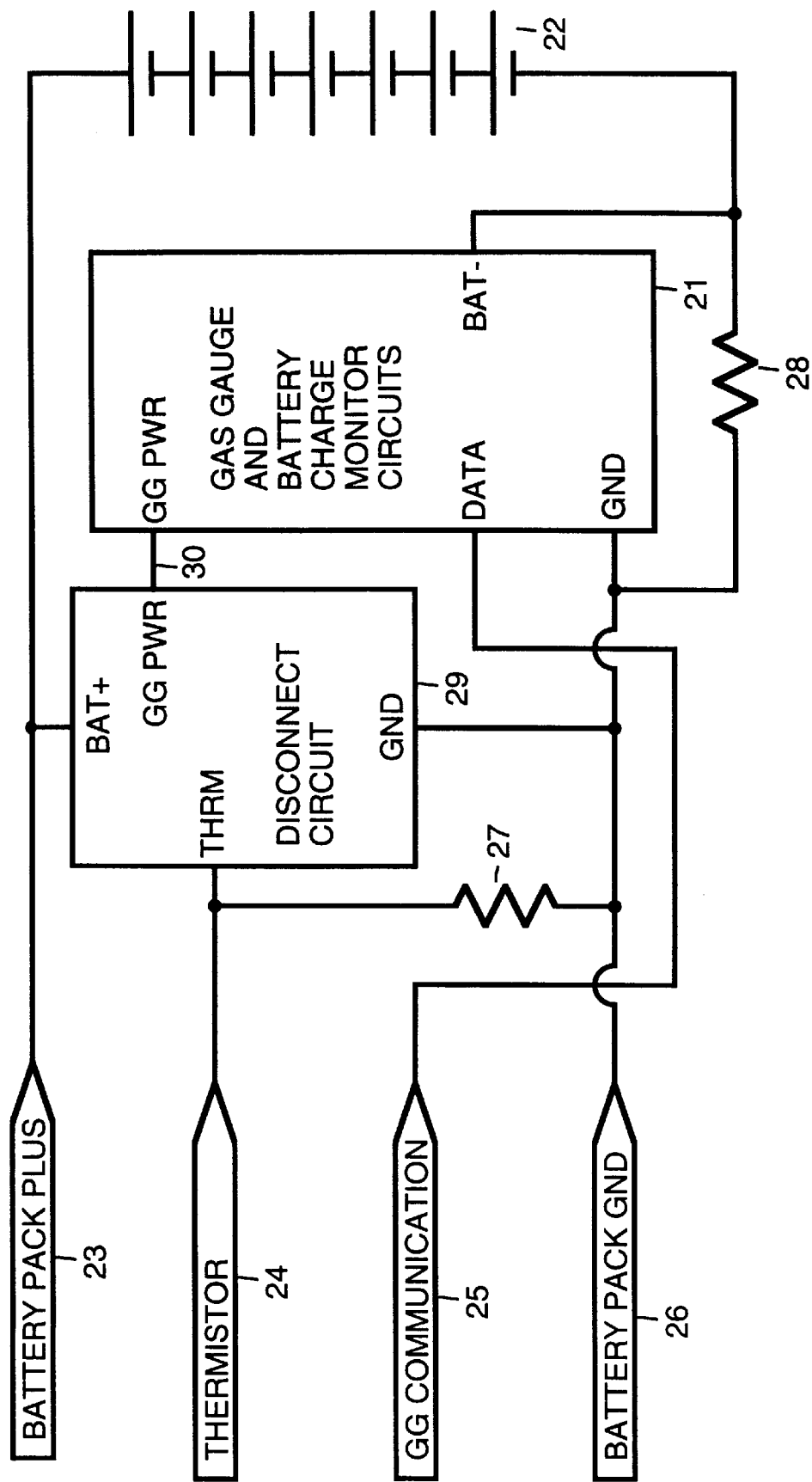
FIG. 2 is a simplified block diagram of a battery pack with a disconnect circuit in accordance with the preferred embodiment of the present invention.

FIG. 2 is a simplified diagram of a battery pack in accordance with the preferred embodiment of the present invention. The battery pack includes battery cells 22. Gas gauge and battery charge monitor circuits 21 function as monitoring circuitry which monitors the charging of battery cells 22 and indicates the amount of charge stored in battery cells 22. Gas gauge and battery charge monitor circuits 21 utilizes a current sense resistor 28 to perform monitoring of the charging of battery cells 22 and to detect the amount of charge stored in battery cells 22.

Disconnect circuitry 29 is used to disengage the gas gauge feature of gas gauge and battery charge monitor circuits 21. A battery pack voltage (BAT+) input of disconnect circuit 29 detects the voltage on a battery pack positive voltage (BATTERY PACK PLUS) connector 23. A ground input (GND) of disconnect circuit 29 is connected to a battery pack ground (GND) connector 26. Ground input (GND) of gas gauge and battery charge monitor circuits 21 is also connected to a thermistor connector 24 through a thermistor resistor 27. Thermistor connector 24 is also connected directly to a thermistor (THRM) input of disconnect circuit 29. A gas gauge power output (GG PWR) output 30 of disconnect circuit 29 is used to supply power to gas gauge and battery charge monitor circuits 21.

A gas gauge input (GG PWR) of gas gauge and battery charge monitor circuits 21 utilizes the voltage on GG PWR output 30 of disconnect circuit 29 as a power source for gas gauge and battery charge monitor circuits 21. A ground input (GND) of gas gauge and battery charge monitor circuits 21 is connected to battery pack ground (GND) connector 26. Ground input (GND) of gas gauge and battery charge monitor circuits 21 is also connected to thermistor connector 24 through thermistor resistor 27. Gas gauge (GG) communication connector 25 is connected to a data input of gas gauge and battery charge monitor circuits 21.

Battery cells 22 can remain charged typically for a few years with minimal cell capacity degradation as long as there is no power load on battery cells 22. When disconnected from other equipment, the power load on battery cells 22 consists of gas gauge and battery charge monitor circuits 21.

In the preferred embodiment of the present invention, it is not necessary to add additional contacts to disconnect power from gas gauge and battery charge monitor circuits 21. Instead, disconnect circuit 29 uses the voltage on thermistor connector 24 for sensing both when to electrically disconnect gas gauge and battery charge monitor circuits 21 and when to re-enable gas gauge and battery charge monitor circuits 21.

Disconnect circuit 29 operates so that a voltage, higher than that typically found in the system, is applied to the thermistor connector 24 to signal that gas gauge and battery charge monitor circuits 21 should be disconnected from battery cells 22. The higher voltage, used to disable gas gauge and battery charge monitor circuits 21, is normally to be applied by the manufacturing vendor or approved storage or repair centers. For users that require a stock of battery packs to be on hand, an external battery charger provides a user selectable method to disable the gas gauge and battery charge monitor circuits. If selected as a feature on the external battery charger, when the battery is fully charged, the external battery charger will disable the gas gauge circuitry and notify the user that the charging process is finished.

When a voltage higher than one volt, but within the range of normal operation (1.5 to 4.0 volts), is applied to thermistor connector 24 it will cause disconnect circuit 29 to enable gas gauge and battery charge monitor circuits 21.

By being able to fully charge battery cells 22 and then use disconnect circuitry to electrically disconnect gas gauge and battery charge monitor circuits 21, the present invention facilitates an important advantage in being able to maintain acceptable shelf life of battery cells 22 without expensive and complicated processes. The battery pack will auto-engage when inserted into an electronic system, such as a notebook computer.

Figure 3:
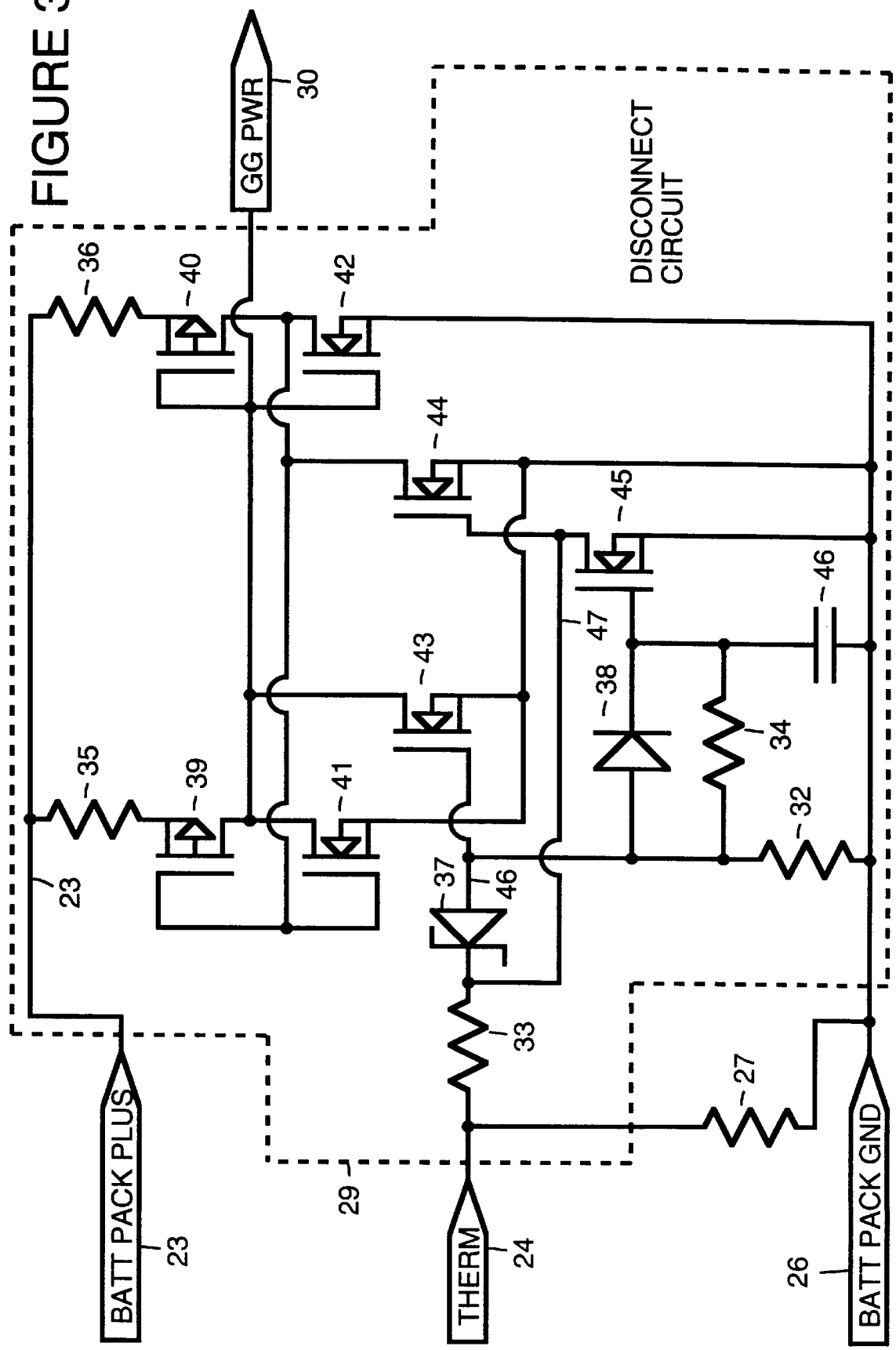
FIG. 3 is a schematic of the disconnect circuit shown in FIG. 1 in accordance with the preferred embodiment of the present invention.

FIG. 3 shows a schematic diagram of disconnect circuit 29 as attached to thermistor resistor 33. Disconnect circuit 29 includes a resistor 32, a resistor 33, a resistor 34, a resistor 35, a resistor 36, a zener diode 37, a diode 38, a transistor 39, a transistor 40, a transistor 41, a transistor 42, a transistor 43, a transistor 44, a transistor 45, and a capacitor 46 connected as shown. Thermistor resistor 27 is connected as shown between thermistor connector 24 and battery pack ground (GND) connector 26. Also shown are GG PWR output 30, a disable battery (DISBAT) node 46 and an enable battery (ENBAT) node 47.

For example, zener diode is a 37 is a 10 volt zener diode. Transistor 39 is a TP610T transistor. Transistor 40 is a TP610T transistor. Transistor 41 is a 2N7002 transistor. Transistor 42 is a 2N7002 transistor. Transistor 43 is a 2N7002 transistor. Transistor 44 is a 2N7002 transistor. Transistor 45 is a 2N7002 transistor.

Figure 4:
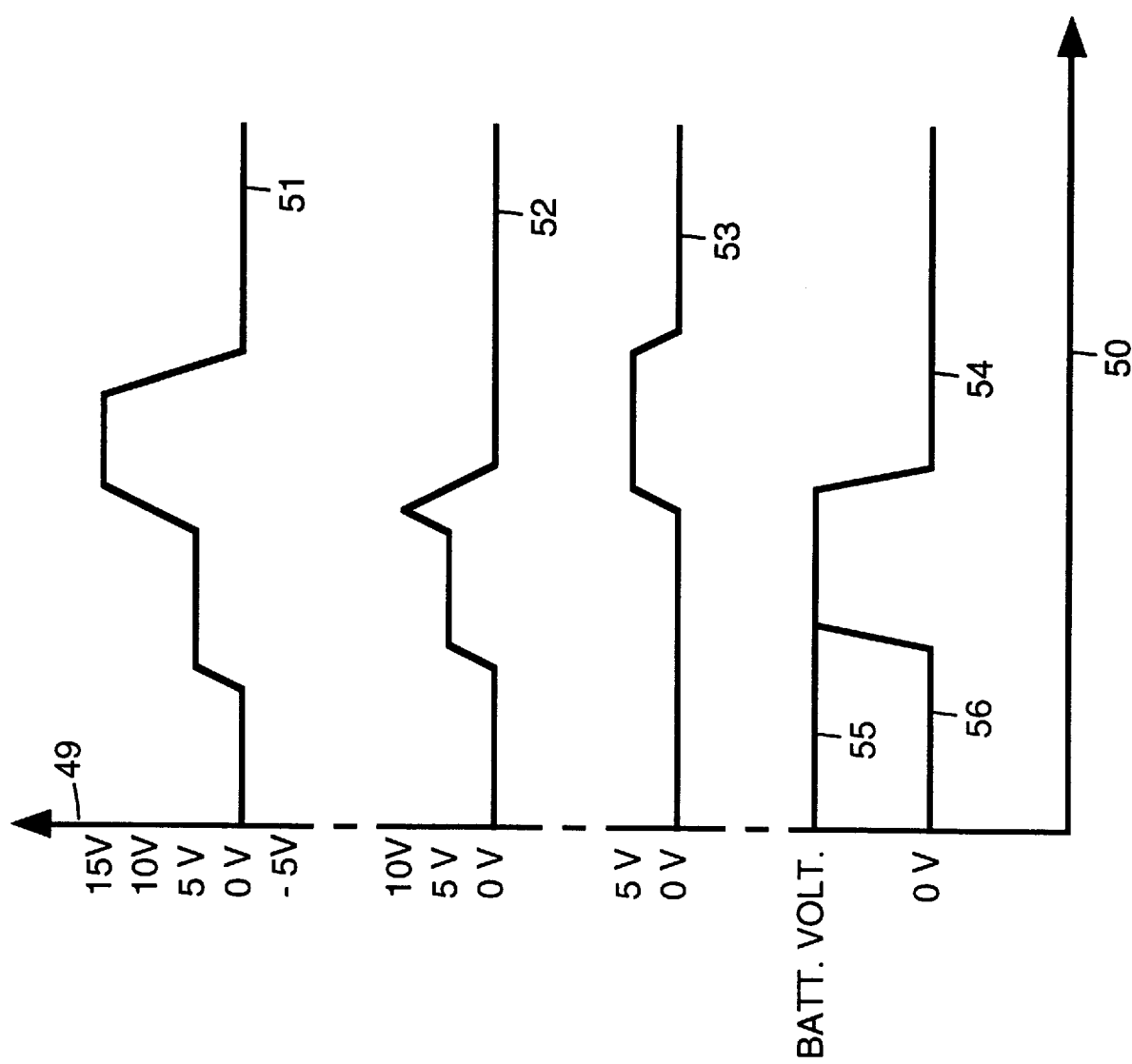
FIG. 4 is a timing diagram to disconnect monitoring circuitry in accordance with the preferred embodiment of the present invention.

FIG. 4 is a timing diagram for disconnect circuit 29 which shows how voltage placed on thermistor connector 24 can be used to cause the voltage on GG PWR output 30 to be at 0 volts which disables gas gauge and battery charge monitor circuits 21. A thermistor voltage value 51 represents the voltage placed on thermistor connector 24. An ENBAT voltage value 52 represents the voltage at enable battery node 47. An DISBAT voltage value 53 represents the voltage at disable battery node 46. A GG PWR voltage value 54 represents the voltage at GG PWR output 30. An x-axis 50 represents elapsed time. A y-axis 49 represents signal voltage as marked.

Before applying a disabling voltage pattern on thermistor connector 24, the GG PWR voltage value 54 can be at the voltage (i.e., 0 volts) on battery pack ground (GND) connector 26, as represented by initial value 56 of GG PWR voltage value 54, or the GG PWR voltage value 54 can be at the voltage (BATT VOLT) on battery pack positive voltage (BATTERY PACK PLUS) connector 23, as represented by initial value 55 of GG PWR voltage value 54.

As is shown by FIG. 4, when a 5 volt DC signal is placed on thermistor connector 24, the voltage at enable battery node 47 rises to five volts and the voltage at GG PWR output 30, regardless of the initial value, stabilizes at the voltage on battery pack positive voltage (BATTERY PACK PLUS) connector 23.

When a 15 volt DC signal is placed on thermistor connector 24, the voltage at enable battery node 47 spikes higher and then falls to 0 volts. The voltage at disable battery node 46 rises to five volts and the voltage at GG PWR output 30 falls to 0 volts.

When a 0 volt DC signal is placed on thermistor connector 24, the voltage at disable battery node 46 falls to 0 volts. The voltage at GG PWR output 30 remains at 0 volts.

While FIG. 4 shows a 5 volt DC signal placed on thermistor connector 24 followed by a 15 volt DC signal being placed on thermistor connector 24, other voltage patterns, for example, immediately placing a 15 volt DC signal (without the intermediate step of placing a 5 volt DC signal) would also work as a disabling voltage pattern. This is seen for example, by the schematic in FIG. 3. Essentially what is needed to produce a disable pattern is to place a significantly high voltage (e.g., over 10 volts) on thermistor connector 24 so that zener diode 37 conducts current. This results in transistor 43 being turned on, electrically connecting GG PWR output to battery pack ground (GND) connector 26. Other circuitry within disconnect circuit 29, as shown in FIG. 3, will lock in this electrical connection.

Figure 5:
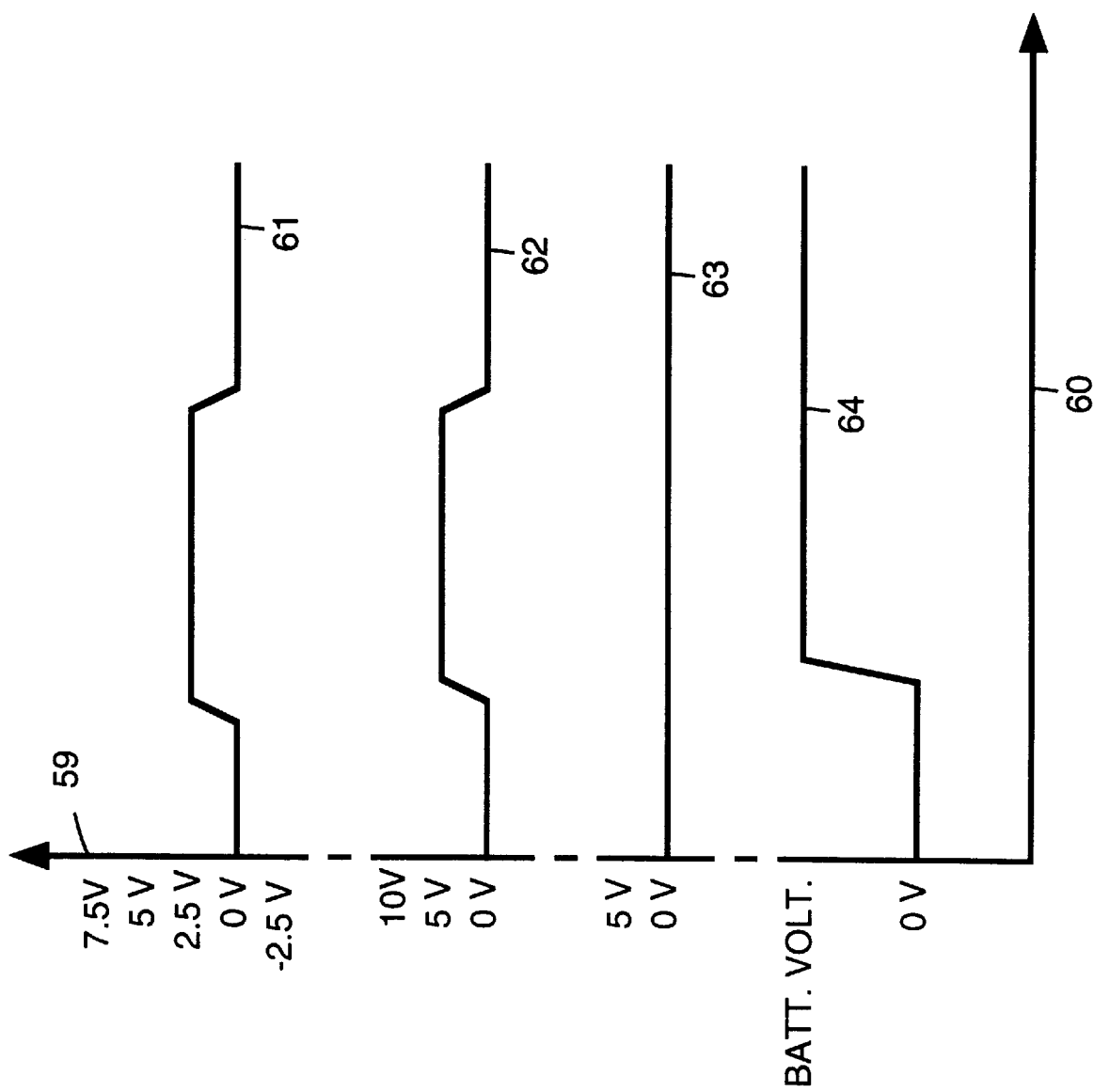
FIG. 5 is a timing diagram to connect monitoring circuitry in accordance with the preferred embodiment of the present invention.

FIG. 5 is a timing diagram for disconnect circuit 29 which shows how voltage placed on thermistor connector 24 can be used to enable the voltage on GG PWR output 30 to be at BATT VOLT, that is, at the voltage on battery pack positive voltage (BATTERY PACK PLUS) connector 23. A thermistor voltage value 61 represents the voltage placed on thermistor connector 24. An ENBAT voltage value 62 represents the voltage at enable battery node 47. A DISBAT voltage value 63 represents the voltage at disable battery node 46. A GG PWR voltage value 64 represents the voltage at GG PWR output 30. An x-axis 60 represents elapsed time. A y-axis 59 represents signal voltage as marked.

As is shown by FIG. 5, when a voltage greater than 1.5 volts but less than 4 volts is placed on thermistor connector 24, the voltage at enable battery node 47 rises to the level of the voltage placed on thermistor connector 24 and the voltage at GG PWR output 30, regardless of the initial value, stabilizes at the voltage on battery pack positive voltage (BATTERY PACK PLUS) connector 23.

When a 0 volt DC signal is placed on thermistor connector 24, the voltage at enable battery node 47 falls to 0 volts. The voltage at GG PWR output 30 remains at the voltage on battery pack positive voltage (BATTERY PACK PLUS) connector 23.

Figure 6:
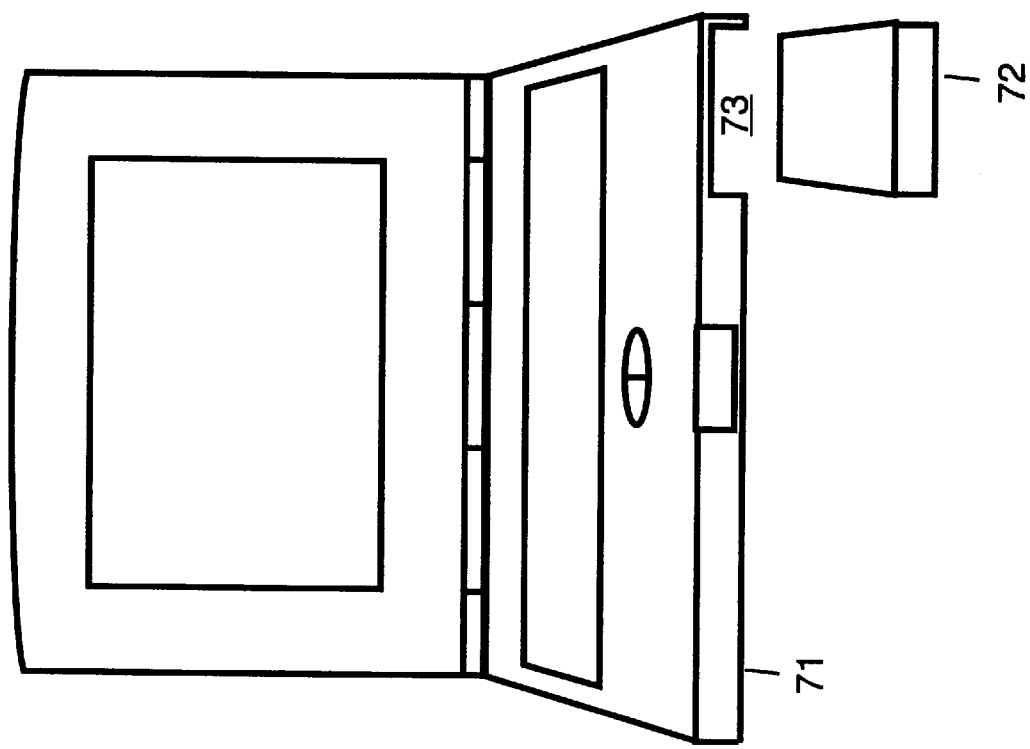
FIG. 6 shows an electronic device receiving a battery pack.

FIG. 6 shows an electronic device 71, in this case a portable computer, receiving a battery pack 72 into a port 73. Battery pack 72 includes disconnect circuit 29, shown in FIG. 3. When electronic device 71 receives battery pack 72 into port 73, an operating voltage is placed on thermistor connector 24. This will result in disconnect circuit 29 switching on gas gauge and battery charge monitor circuits 21 as shown in FIG. 2 and as described above.

Figure 7:
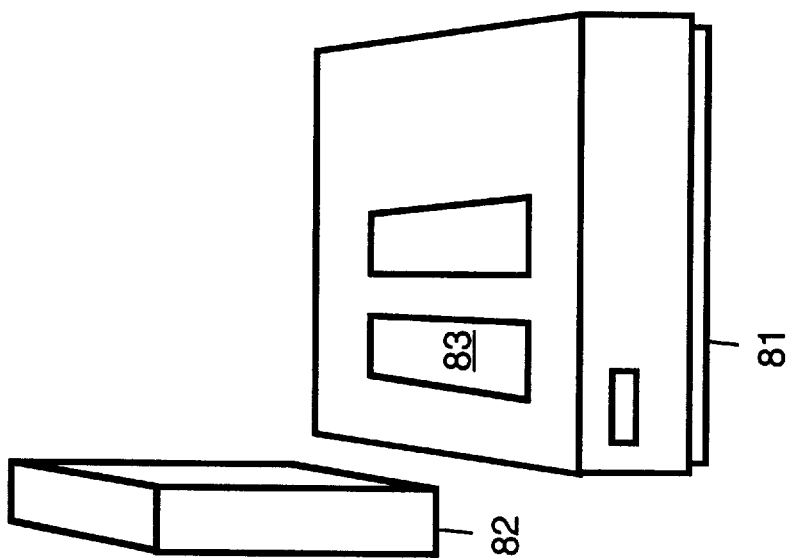
FIG. 7 shows a battery charger receiving a battery pack.

FIG. 7 shows an battery charger 81 receiving a battery pack 82 into a charging port 83. Battery pack 82 includes disconnect circuit 29, shown in FIG. 3. When battery charger 81 receives battery pack 82 into port 83, an operating voltage is placed on thermistor connector 24. This will result in disconnect circuit 29 switching on gas gauge and battery charge monitor circuits 21 as shown in FIG. 2 and as described above.

FIG. 8 shows an electronic device 91, in this case a portable phone, receiving a battery pack 92 into a battery port 93. Battery pack 92 includes disconnect circuit 29, shown in FIG. 3. When electronic device 91 receives battery pack 92 into port 93, an operating voltage is placed on thermistor connector 24. This will result in disconnect circuit 29 switching on gas gauge and battery charge monitor circuits 21 as shown in FIG. 2 and as described above.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A battery pack comprising:

battery storage having a positive terminal and a negative terminal;

a power connector, coupled to the positive terminal of the battery storage;

a ground connector, coupled to the negative terminal of the battery storage;

an additional connector;

battery monitoring circuitry for monitoring the battery storage, the battery monitoring circuitry having a power input; and disconnect circuitry, coupled to the positive terminal of the battery storage, to the ground connector, to the additional connector and to the power input of the battery monitoring circuit, the disconnect circuitry in response to a first voltage pattern on the additional connector, electrically coupling the power input of the battery monitoring circuitry to the positive terminal of the battery storage, and the disconnect circuitry in response to a second voltage pattern on the additional connector, electrically disconnecting the power input of the battery monitoring circuitry from the positive terminal of the battery storage.

2. A battery pack as in claim 1 wherein the additional connector is a thermistor connector and wherein the battery pack additionally comprises a thermistor resistor coupled between the thermistor connector and the ground connector.

3. A battery pack as in claim 2 wherein the first voltage pattern includes normal operating voltage for the thermistor connector and the second voltage pattern includes an atypical voltage which is not placed on the thermistor connector during normal operating conditions.

4. A battery pack as in claim 3 wherein the atypical voltage is a voltage that is higher than the normal operating voltage.

5. A battery pack as in claim 1 wherein the disconnect circuitry includes:

switching means for, in a first state, electrically coupling the power input of the battery monitoring circuitry to the positive terminal of the battery storage, and for, in a second state, electrically coupling the power input of the battery monitoring circuitry to the negative terminal of the battery storage; and, control circuitry, coupled to the additional connector, the control circuitry in response to the first voltage pattern causing the switching means to be in the first state, and the control circuitry in response to the second voltage pattern causing the switching means to be in the second state.

6. A battery pack as in claim 5 wherein the control circuitry includes a zener diode.

7. A battery pack as in claim 1 wherein the battery monitoring circuitry comprises battery gauge circuitry which monitors charge in the battery storage.

8. A method for preserving charge in a battery pack which includes battery monitoring circuitry, the battery pack having battery storage, a power connector coupled to a positive terminal of the battery storage, a ground connector coupled to the negative terminal of the battery storage and an additional connector, the method comprising the following steps:

(a) electrically coupling a power input of the battery monitoring circuitry to the positive terminal of the battery storage within the battery pack in response to a first voltage pattern on the additional connector; and, (b) electrically disconnecting the power input of the battery monitoring circuitry from the positive terminal of the battery storage in response to a second voltage pattern on the additional connector.

9. A method as in claim 8 wherein the additional connector is a thermistor connector.

10. A method as in claim 9 wherein:

step (a) includes placing a normal operating voltage on the thermistor connector; and, step (b) includes placing an atypical voltage on the thermistor connector which is not placed on the thermistor connector during normal operating conditions.

11. A method as in claim 10 wherein in step (b) the atypical voltage is a voltage that is higher than the normal operating voltage.

12. A method as in claim 8 wherein step (b) includes electrically coupling the power input of the battery monitoring circuitry to the negative terminal of the battery storage within the battery pack in response to the second voltage pattern on the additional connector.

13. A method as in claim 8 wherein subsequent to step (a) the battery monitoring circuitry monitors charge in the battery storage when the power input of the battery monitoring circuitry is electrically coupled to the positive terminal of the battery storage within the battery pack.

14. Disconnect circuitry for preserving charge in a battery pack which includes battery monitoring circuitry, the battery pack having battery storage, a power connector coupled to a positive terminal of the battery storage, a ground connector coupled to the negative terminal of the battery storage and an additional connector, the disconnect circuitry comprising:

connection means for electrically coupling a power input of the battery monitoring circuitry to the positive terminal of the battery storage within the battery pack in response to a first voltage pattern on the additional connector; and, disconnection means for electrically disconnecting the power input of the battery monitoring circuitry from the positive terminal of the battery storage in response to a second voltage pattern on the additional connector.

15. Disconnect circuitry as in claim 14 wherein the additional connector is a thermistor connector and wherein the battery pack additionally includes a thermistor resistor coupled between the thermistor connector and the ground connector.

16. Disconnect circuitry as in claim 15 wherein the second voltage pattern includes normal operating voltage for the thermistor connector and the second voltage pattern includes an atypical voltage which is not placed on the thermistor connector during normal operating conditions.

17. Disconnect circuitry as in claim 16 wherein the atypical voltage is a voltage that is higher than the normal operating voltage.

18. Disconnect circuitry as in claim 14 wherein the connection means includes:

switching means for, in a first state, electrically coupling the power input of the battery monitoring circuitry to the positive terminal of the battery storage, and for in a second state, electrically coupling the power input of the battery monitoring circuitry to the negative terminal of the battery storage;

control circuitry, coupled to the additional connector, the control circuitry in response to the first voltage pattern causing the switching means to be in the first state.

19. Disconnect circuitry as in claim 14 wherein the disconnection means includes:

the switching means; and, additional control circuitry, coupled to the additional connector, the additional control circuitry in response to the second voltage pattern causing the switching means to be in the second state.

20. Disconnect circuitry as in claim 19 wherein the additional control circuitry includes a zener diode.

21. An electronic system, comprising:

a battery pack, the battery pack comprising:

battery storage having a positive terminal and a negative terminal, a power connector, coupled to the positive terminal of the battery storage, a ground connector, coupled to the negative terminal of the battery storage, an additional connector, battery monitoring circuitry for monitoring the battery storage, the battery monitoring circuitry having a power input, and disconnect circuitry, coupled to the positive terminal of the battery storage, to the ground connector, to the additional connector and to the power input of the battery monitoring circuit, the disconnect circuitry having a first state in which the power input of the battery monitoring circuitry is electrically connected to the positive terminal of the battery storage, and the disconnect circuitry having a second state in which the power input of the battery monitoring circuitry is electrically disconnected from the positive terminal of the battery storage; and, an electronic device having a port for receiving the battery pack;

wherein the disconnect circuitry includes switching means for automatically switching the disconnect circuitry from the second state to the first state upon the battery pack being received by the port of the electronic device when the battery pack is in the second state immediately before being received by the port of the electronic device.

22. An electronic system as in claim 21 wherein the disconnect circuitry remains in the first state upon the battery pack being received by the port of the electronic device when the battery pack is in the first state immediately before being received by the port of the electronic device.

23. A battery charging system, comprising:

a battery pack, the battery pack comprising:

battery storage having a positive terminal and a negative terminal, a power connector, coupled to the positive terminal of the battery storage, a ground connector, coupled to the negative terminal of the battery storage, an additional connector, battery monitoring circuitry for monitoring the battery storage, the battery monitoring circuitry having a power input, and disconnect circuitry, coupled to the positive terminal of the battery storage, to the ground connector, to the additional connector and to the power input of the battery monitoring circuit, the disconnect circuitry having a first state in which the power input of the battery monitoring circuitry is electrically connected to the positive terminal of the battery storage, and the disconnect circuitry having a second state in which the power input of the battery monitoring circuitry is electrically disconnected from the positive terminal of the battery storage; and, a battery charger having a port for receiving the battery pack;

wherein the disconnect circuitry includes switching means for automatically switching the disconnect circuitry from the second state to the first state upon the battery pack being received by the port of the battery charger when the battery pack is in the second state immediately before being received by the port of the battery charger.

24. A battery charging system as in claim 23 wherein the disconnect circuitry remains in the first state upon the battery pack being received by the port of the battery charger when the battery pack is in the first state immediately before being received by the port of the battery charger.

25. An electronic device, comprising:
   a battery pack, the battery pack comprising:
      battery storage having a positive terminal and a negative terminal,
      a power connector, coupled to the positive terminal of the battery storage,
      a ground connector, coupled to the negative terminal of the battery storage,
      an additional connector,
      battery monitoring circuitry for monitoring the battery storage, the battery monitoring circuitry having a power input, and
      disconnect circuitry, coupled to the positive terminal of the battery storage, to the ground connector, to the additional connector and to the power input of the battery monitoring circuit, the disconnect circuitry in response to a first voltage pattern on the additional connector, electrically coupling the power input of the battery monitoring circuitry to the positive terminal of the battery storage, and the disconnect circuitry in response to a second voltage pattern on the additional connector, electrically disconnecting the power input of the battery monitoring circuitry from the positive terminal of the battery storage; and,
   a port for receiving the battery pack.

26. An electronic device as in claim 25 wherein the electronic device is a portable computer.

27. An electronic device as in claim 25 wherein the electronic device is a portable phone.

* * * * *